United States Patent
Nelogal et al.

(10) Patent No.: US 10,303,560 B2
(45) Date of Patent: May 28, 2019

(54) SYSTEMS AND METHODS FOR ELIMINATING WRITE-HOLE PROBLEMS ON PARITY-BASED STORAGE RESOURCES DURING AN UNEXPECTED POWER LOSS

(71) Applicant: Dell Products L.P., Round Rock, TX (US)

(72) Inventors: Chandrashekar Nelogal, Round Rock, TX (US); Anand Nunna, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 130 days.

(21) Appl. No.: 15/431,932

(22) Filed: Feb. 14, 2017

(65) Prior Publication Data

US 2018/0232277 A1    Aug. 16, 2018

(51) Int. Cl.
G06F 11/00    (2006.01)
G06F 11/14    (2006.01)
G06F 12/0804  (2016.01)
G06F 11/10    (2006.01)

(52) U.S. Cl.
CPC ........ *G06F 11/1469* (2013.01); *G06F 11/108* (2013.01); *G06F 12/0804* (2013.01); *G06F 2201/84* (2013.01); *G06F 2212/1032* (2013.01); *G06F 2212/60* (2013.01)

(58) Field of Classification Search
CPC ............ G06F 11/1096; G06F 11/1469; G06F 11/0727; G06F 11/1076; G06F 11/1446; G06F 11/1471; G06F 12/0804; G06F 2201/84; G06F 2212/1032; G06F 2212/60; G06F 11/108
See application file for complete search history.

(56) References Cited

U.S. PATENT DOCUMENTS

| | | | |
|---|---|---|---|
| 2004/0193945 A1* | 9/2004 | Eguchi | G06F 11/142 714/6.1 |
| 2007/0055909 A1* | 3/2007 | Smith | G06F 11/1076 714/22 |
| 2014/0082261 A1* | 3/2014 | Cohen | G11C 16/06 711/103 |
| 2014/0089728 A1* | 3/2014 | Veal | G06F 11/1474 714/6.21 |
| 2015/0193156 A1* | 7/2015 | Patel | G06F 11/1471 711/103 |
| 2017/0123921 A1* | 5/2017 | Ptak | G06F 11/1096 |

* cited by examiner

*Primary Examiner* — Joseph D Manoskey
(74) *Attorney, Agent, or Firm* — Jackson Walker L.L.P.

(57) ABSTRACT

In accordance with embodiments of the present disclosure, a method may include, during a cache flush of data of a cache entry from a non-volatile memory to a storage resource, wherein the non-volatile memory is integral to a persistent write-back cache and storing the data in response to a power event associated with the write-back cache: (a) calculating a calculated parity value by undertaking a read-modify-write operation with respect to the storage resource; and (b) storing the calculated parity value and a target address of the storage resource associated with the calculated parity value in a parity journal.

24 Claims, 4 Drawing Sheets

| ADDRESS | PARITY OR DATA |
|---|---|
| $A_0$ | $P_0$ |
| $A_1$ | $P_1$ |
| $A_2$ | $P_2$ |
| ⋮ | ⋮ |
| $A_N$ | $P_N$ |
| $B_0$ | $D_0$ |
| $B_1$ | $D_1$ |
| $B_2$ | $D_2$ |
| ⋮ | ⋮ |
| $B_N$ | $D_N$ |

FIG. 3

SYSTEMS AND METHODS FOR ELIMINATING WRITE-HOLE PROBLEMS ON PARITY-BASED STORAGE RESOURCES DURING AN UNEXPECTED POWER LOSS

TECHNICAL FIELD

The present disclosure relates in general to information handling systems, and more particularly to systems and methods for improvement of performance of storage systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use storage resources (e.g., hard disk drives, solid state drives, and/or arrays thereof) to store data. To provide resiliency against failure of individual storage resources, many systems employ redundancy of storage resources, oftentimes using Redundant Array of Inexpensive Disks or RAID. One type of RAID often utilized is parity-based RAID, such as RAID 5, for example. In its simplest form, parity-based RAID works by writing stripes of data across three or more physical storage resources, writing a data strip to N−1 of the physical storage resources of the RAID array and a parity strip to one of the physical storage resources of the RAID array, where "N" equals the number of devices in the RAID array. Each written parity strip may be written as the logical exclusive OR (XOR) of the data strips of within the same stripe as the parity strip. Accordingly, if a physical storage resource of a RAID array fails, the data and/or parity stored on the failed storage resource can be rebuilt by performing a logical XOR.

Increasingly, storage systems are employing persistent memory as a write-back cache support for RAID arrays, in order to improve storage performance in terms of throughput and latency. Oftentimes, such persistent memory is implemented with a volatile memory backed by a battery or other energy storage devices and a non-volatile memory. Thus, responsive to a power fault of a power source for powering the write-back cache, the battery may provide the volatile memory with sufficient electrical energy to write cached data to the non-volatile memory, such that when power is again applied, cached data backed up to the non-volatile memory can be used to flush written data to physical storage devices, thus reducing or eliminating data loss that would otherwise occur if cached data was lost before flushed to the physical storage resources.

However, despite the advantages of existing persistent memory-based write-back cache implementations, certain conditions and scenarios exist in which use of a persistent memory-based write-back cache implementation may still lead to data corruption. For example, one scenario in which data corruption could occur is known as a "write-hole problem," wherein a first power loss occurs, and then a second power loss occurs shortly thereafter during a cache flush of the data stored to non-volatile memory of the write-back cache in response to the first power loss. During this second power loss, another backup of data in the volatile portion of the cache may not take place, as all of the "dirty" cache data in the non-volatile memory of the cache may not be erased until all data is confirmed as having been flushed. Such potential data corruption may occur due to the fact that during the cache flush occurring before the second power event, data may be written to a particular strip but not its associated calculated parity, or the calculated parity may be written to a particular strip, but not its associated data. After the second power event, when another cache flush is attempted from data stored in the non-volatile memory, it is then possible that incorrect parity information or incorrect data information may be used in connection with a read-modify-write operation used to calculate parity information to be written as part of the cache flush occurring after the second power event, which can result in the parity information being calculated incorrectly. Thus, if the RAID subsequently becomes degraded due to a failure of a storage resource within the RAID, the existence of the incorrect parity may lead to incorrect calculation of data for the rebuilt physical storage resource replacing the failed physical storage resource, and accordingly, data may be corrupted.

To illustrate the write whole problem, consider that data D2' is new data for which parity P' needs to be calculated as $P'=P \oplus D2 \oplus D2'$, where P is the "old" parity data, D2 is the data to be overwritten by data D2' and $\oplus$ is a logical XOR. In a cache flush, each of D2' and P' would need to be written to disk.

If both P' and D2' are written during a cache flush, or neither is written, then no data corruption may exist. However, if due to a second abrupt power loss occurring shortly after a first power loss, if P' is written but D2' is not, a read-modify-write operation during the cache flush occurring after the second power loss may lead to corruption of parity data: $P''=P' \oplus D2 \oplus D2'$. On the other hand, if D2' is written and P' is not, a read-modify-write operation during the cache flush occurring after the second power loss may lead to corruption of parity data: $P''=P \oplus D2 \oplus D2$. Thus, a subsequent rebuild or data regeneration using the P''' parity would lead to data corruption.

SUMMARY

In accordance with the teachings of the present disclosure, the disadvantages and problems associated with storage systems may be reduced or eliminated.

In accordance with embodiments of the present disclosure, a method may include, during a cache flush of data of a cache entry from a non-volatile memory to a storage resource, wherein the non-volatile memory is integral to a persistent write-back cache and storing the data in response to a power event associated with the write-back cache: (a)

determining whether a parity journal embodied in persistent memory includes an entry having a calculated parity for data existing in the persistent write-back cache generated during a previous boot session of an information handling system comprising the write-back cache; (b) determining whether a parity journal embodied in persistent memory includes an entry indicating a write operation uncompleted during a previous boot session; (c) in response to the parity journal including an entry having a calculated parity, issuing write requests to the storage resource for the data existing in the persistent write-back cache and the calculated parity; and (d) in response to the parity journal indicating a write operation uncompleted during a previous boot session, issuing a write request to the storage resource for data existing in the persistent write-back cache associated with the write operation.

In accordance with these and other embodiments of the present disclosure, a system may include a persistent write-back cache comprising a volatile memory, a non-volatile memory for backing up data stored within the volatile memory in response to a power event associated with the write-back cache, and a processor configured to, during a cache flush of data of a cache entry from the non-volatile memory to a storage resource in response to a power event associated with the write-back cache: (a) determine whether a parity journal embodied in persistent memory includes an entry having a calculated parity for data existing in the persistent write-back cache during a previous boot session of an information handling system comprising the write-back cache; (b) determine whether a parity journal embodied in persistent memory includes an entry indicating a write operation uncompleted during a previous boot session; (c) in response to the parity journal including an entry having a calculated parity, issue write requests to the storage resource for the data existing in the persistent write-back cache and the calculated parity; and (d) in response to the parity journal indicating a write operation uncompleted during a previous boot session, issue a write request to the storage resource for data existing in the persistent write-back cache associated with the write operation.

In accordance with these and other embodiments of the present disclosure, a method may include, during a cache flush of data of a cache entry from a non-volatile memory to a storage resource, wherein the non-volatile memory is integral to a persistent write-back cache and storing the data in response to a power event associated with the write-back cache: (a) calculating a calculated parity value by undertaking a read-modify-write operation with respect to the storage resource; and (b) storing the calculated parity value and a target address of the storage resource associated with the calculated parity value in a parity journal.

In accordance with these and other embodiments of the present disclosure, a system may include a persistent write-back cache comprising a volatile memory, a non-volatile memory for backing up data stored within the volatile memory in response to a power event associated with the write-back cache, and a processor configured to, during a cache flush of data of a cache entry from the non-volatile memory to a storage resource in response to a power event associated with the write-back cache: (a) calculate a calculated parity value by undertaking a read-modify-write operation with respect to the storage resource; and (b) store the calculated parity value and a target address of the storage resource associated with the calculated parity value in the parity journal.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates an example parity journal, in accordance with embodiments of the present disclosure.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive, solid state drive, or floppy disk), a sequential access storage device (e.g., a tape disk drive), compact disk, CD-ROM, DVD, random access memory (RAM), read-only memory (ROM), electrically erasable programmable read-only memory (EEPROM), and/ or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
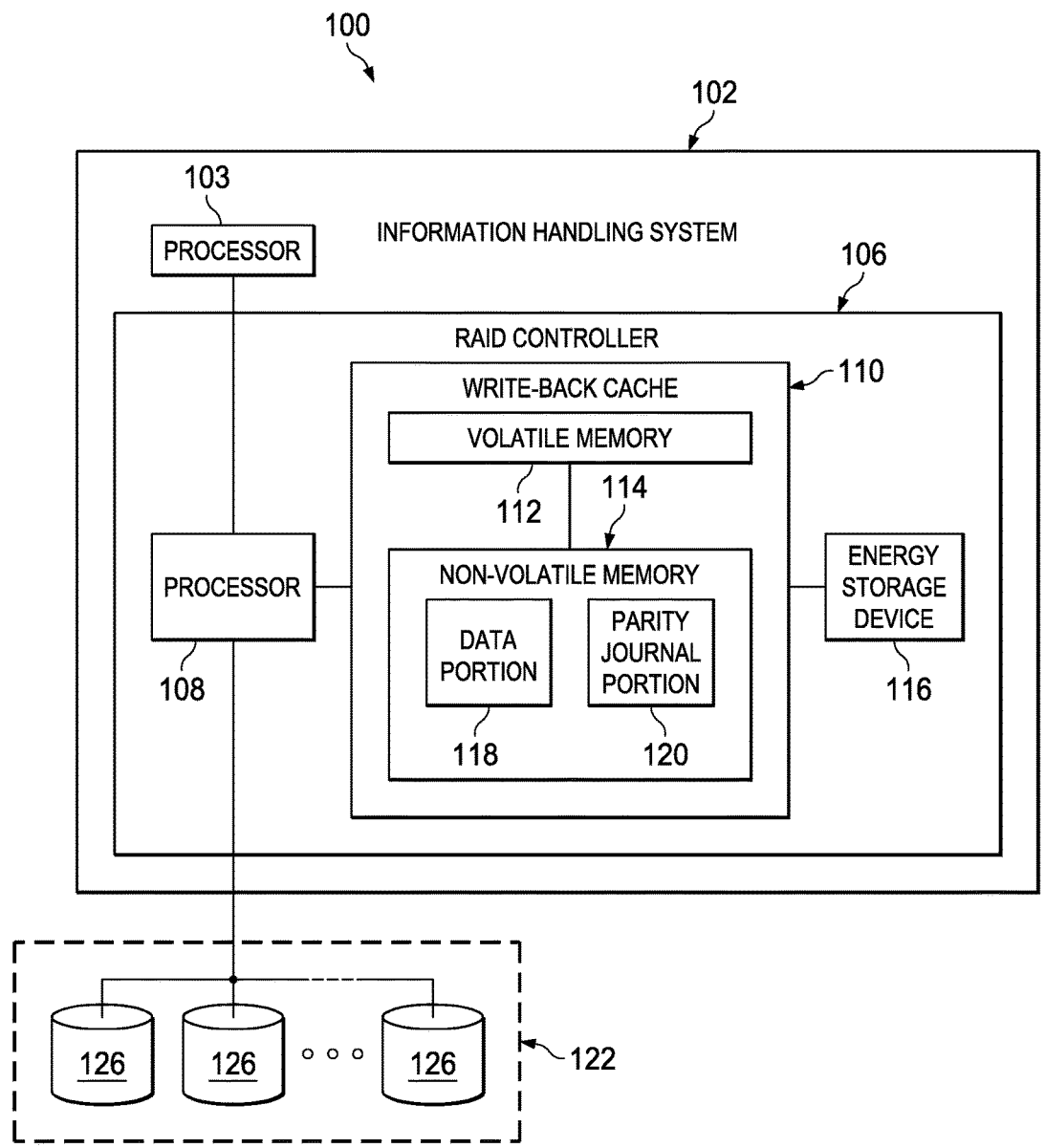
FIG. 1 illustrates a block diagram of an example system having an information handling system coupled to a virtual storage resource comprising a plurality of physical storage resources, wherein the information handling system employs hardware-based storage redundancy, in accordance with embodiments of the present disclosure.

FIG. 1 illustrates a block diagram of an example system 100 having an information handling system 102 coupled to a virtual storage resource 122 comprising a plurality of physical storage resources 126, wherein the information handling system 102 employs hardware-based storage redundancy, in accordance with embodiments of the present disclosure.

In some embodiments, information handling system 102 may comprise a server. In these and other embodiments, information handling system 102 may comprise a personal computer. In other embodiments, information handling system 102 may be a portable computing device (e.g., a laptop, notebook, tablet, handheld, smart phone, personal digital assistant, etc.). As depicted in FIG. 1, information handling system 102 may include a processor 103 and a RAID controller 106 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or to process data. In some embodiments, processor 103 may interpret and/or execute program instructions and/or process data stored in RAID controller 106, another component of information handling system 102, and/or another component of system 100.

RAID controller 106 may be communicatively coupled to processor 103 and may include any system, device, or apparatus configured to serve as an interface between processor 103 and physical storage resources 126 of virtual storage resource 122 to facilitate communication of data between processor 103 and physical storage resources 126 in accordance with any suitable standard or protocol. For example, RAID controller 106 may comprise any system, device, or apparatus configured to implement RAID within virtual storage resource 122 (including striping of data across physical storage resources 126, calculation of parity, control of input/output operations between processor 103 and virtual storage resource 122, etc.). As shown in FIG. 1, RAID controller 106 may comprise a processor 108, write-back cache 110, and energy storage device 116.

Processor 108 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 108 may interpret and/or execute program instructions and/or process data stored in write-back cache 110 and/or another component of RAID controller 106.

Write-back cache 110 may comprise a memory used by processor 108 to reduce the average time to access data from virtual storage resource 122. For instance, data associated with a write request from processor to virtual storage resource 122 may be stored in write-back cache 110 without also writing the data to virtual storage resource 122, until a subsequent action such as cache line invalidate or flush operation (e.g., in response to a power on after a unexpected power down event) forces the data to be written back to virtual storage resource 122. Thus, the most up-to-date copy of the data to be stored on virtual storage resource 122 may only reside in write-back cache 110 until flushed. As shown in FIG. 1, write-back cache 110 may comprise a persistent memory (e.g., comprising one or more non-volatile dual-inline memory modules or NVDIMMs) that includes a volatile memory 112 (e.g., DRAM or other volatile random-access memory) and non-volatile memory 114 (e.g., flash memory or other non-volatile memory). During normal operation, when RAID controller 106 receives adequate electrical energy from a power supply unit (not explicitly shown in FIG. 1), data written to write-back cache 110 may be stored in volatile memory 112. However, in the event of loss of system input power or a power fault that prevents delivery of electrical energy to RAID controller 106, data stored in volatile memory 112 may be transferred to a data portion 118 of non-volatile memory 114 in a data save operation. After input power is restored, or a faulty power supply unit is replaced, such that RAID controller 106 again receives adequate electrical energy, on the subsequent power-on of information handling system 102, data may be copied from data portion 118 of non-volatile memory 114 back to volatile memory 112 via a restore operation. The combined actions of data save and then data restore, allows the data to remain persistent through a power disruption. Accordingly, although not explicitly shown in FIG. 1, write-back cache 110 may also include hardware, firmware, and/or software for carrying out save and restore operations. In addition, upon such subsequent power-on, processor 108 may cause write-back cache 110 to issue a cache flush in order to flush all data backed up via the save operation to virtual storage resource 122.

In addition to data portion 118, non-volatile memory 114 may also include parity journal portion 120. As described in more detail below, parity journal portion 120 may be configured to store a parity journal which, during cache flush operations from backed-up cache data stored in data portion 118 of non-volatile memory 114, may store for each portion of parity data to be written to virtual storage resource 122 for which the write operation thereof has not been acknowledged by its target physical storage resource 126, a target address and value of such parity data. Although FIG. 1 depicts parity journal portion 120 as being integral to non-volatile memory 114, in some embodiments parity journal portion 120 may be stored in a persistent memory external to non-volatile memory 114.

Although the storage system of FIG. 1 depicts only a write-back cache 110, it is noted that a cache for implementing write-back caching may also be used for read caching.

Energy storage device 116 may comprise any system, device, or apparatus configured to store energy which may be used by write-back cache 110 to perform save operations in response to a loss of system input power source (e.g., alternating current input source) or other power fault. In some embodiments, energy storage device 116 may comprise a battery configured to convert stored chemical energy into electrical energy. In other embodiments, energy storage device 116 may comprise a capacitor or "supercap" configured to store electrical energy and deliver such electrical energy to write-back cache 110 when needed to perform save operations (e.g., by closure of a switch to electrically couple such a capacitor to components of write-back cache 110). Although energy storage device 116 is shown in FIG. 1 as external to write-back cache 110, in some embodiments energy storage device 116 may be integral to write-back cache 110. Although energy storage device 116 is shown in FIG. 1 as internal to RAID controller 106, in some embodiments energy storage device 116 may be external to RAID controller 106.

In addition to processor 103 and RAID controller 106, information handling system 102 may include one or more other information handling resources.

Physical storage resources 126 may include hard disk drives, magnetic tape libraries, optical disk drives, magneto-optical disk drives, compact disk drives, compact disk arrays, disk array controllers, and/or any other system, apparatus or device operable to store media. In operation, one or more physical storage resources 126 may appear to an operating system or virtual machine executing on information handling system 102 as a single logical storage unit or virtual storage resource 122. For example, virtual storage resource 122 may comprise a RAID. Thus, in some embodiments, virtual storage resource 122 may comprise a redundant array of physical storage resources 126, wherein at least one of the physical storage resources 126 making up virtual storage resource 122 enables data redundancy in order to avoid loss of data in the event of failure and/or removal of one of the storage resources 126 making up virtual storage resource 122. Thus, virtual storage resource 122 may be implemented using a RAID standard.

Figure 2:
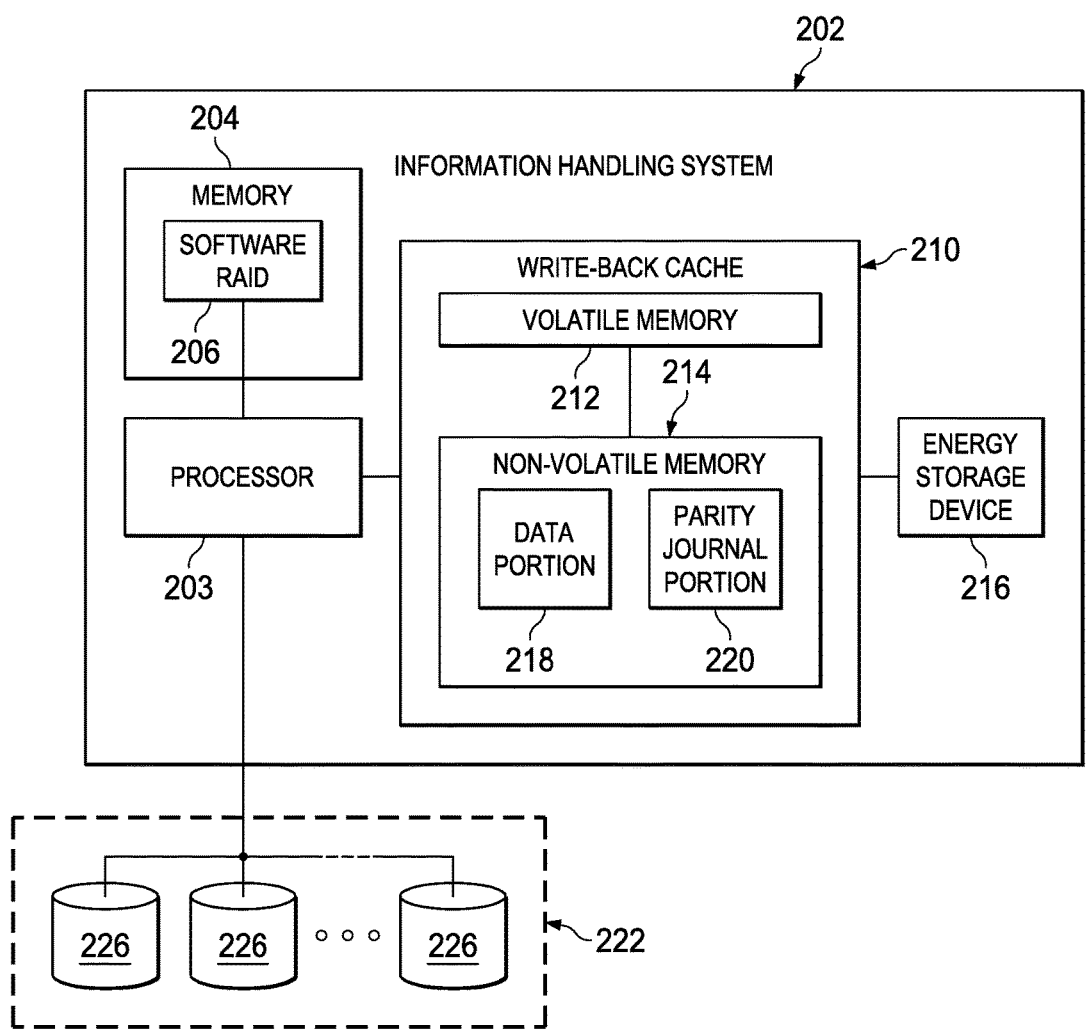
FIG. 2 illustrates a block diagram of an example system having an information handling system coupled to a virtual storage resource comprising a plurality of physical storage resources, wherein the information handling system employs software-based storage redundancy, in accordance with embodiments of the present disclosure.

FIG. 2 illustrates a block diagram of an example system 200 having an information handling system 202 coupled to a virtual storage resource 222 comprising a plurality of physical storage resources 226, wherein the information handling system 202 employs hardware-based storage redundancy, in accordance with embodiments of the present disclosure.

In some embodiments, information handling system 202 may comprise a server. In these and other embodiments, information handling system 202 may comprise a personal computer. In other embodiments, information handling system 202 may be a portable computing device (e.g., a laptop, notebook, tablet, handheld, smart phone, personal digital assistant, etc.). As depicted in FIG. 2, information handling system 202 may include a processor 203, a memory 204 communicatively coupled to processor 203, a write-back cache 210 communicatively coupled to processor 203, and an energy storage device 216 electrically coupled to write-back cache 210.

Processor 203 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 203 may interpret and/or execute program instructions and/or process data stored in memory 204, another component of information handling system 202, and/or another component of system 200.

Memory 204 may be communicatively coupled to processor 203 and may include any system, device, or apparatus configured to retain program instructions and/or data for a period of time (e.g., computer-readable media). Memory 204 may include RAM, EEPROM, a PCMCIA card, flash memory, magnetic storage, opto-magnetic storage, or any suitable selection and/or array of volatile or non-volatile memory that retains data after power to information handling system 202 is turned off.

As shown in FIG. 2, memory 204 may have stored thereon software RAID 206. Software RAID 206 may comprise any suitable program of instructions configured to, when loaded and executed by processor 203, emulate or otherwise perform operations similar to that of a hardware controller, thus serving as an interface between processor 203 and physical storage resources 226 of virtual storage resource 222 to facilitate communication of data between processor 203 and physical storage resources 226 in accordance with any suitable standard or protocol. For example, software RAID 206 may be configured to implement RAID within virtual storage resource 222 (including striping of data across physical storage resources 226, calculation of parity, control of input/output operations between processor 203 and virtual storage resource 222, etc.).

Write-back cache 210 may comprise a memory used by software RAID 206 to reduce the average time to access data from virtual storage resource 222. For instance, data associated with a write request from processor to virtual storage resource 222 may be stored in write-back cache 210 without also writing the data to virtual storage resource 222, until a subsequent action such as cache line invalidate or flush operation (e.g., in response to a power on after an unexpected power down event) forces the data to be written back to virtual storage resource 222. Thus, the most up-to-date copy of the data to be stored on virtual storage resource 222 may only reside in write-back cache 210 indefinitely. As shown in FIG. 2, write-back cache @10 may comprise a persistent memory (e.g., comprising one or more non-volatile dual-inline memory modules or NVDIMMs) that includes a volatile memory 212 (e.g., DRAM or other volatile random-access memory) and non-volatile memory 214 (e.g., flash memory or other non-volatile memory). During normal operation, when write-back cache 210 receives adequate electrical energy from a power supply unit (not explicitly shown in FIG. 2), data written to write-back cache 210 may be stored in volatile memory 212. However, in the event of loss of system input power or a power fault that prevents delivery of electrical energy to write-back cache 210, data stored in volatile memory 212 may be transferred to a data portion 218 of non-volatile memory 214 in a save operation. After input power is restored, or a faulty power supply unit is replaced, such that write-back cache 210 again receives adequate electrical energy, on the subsequent power-on of information handling system 202, data may be copied from data portion 218 of non-volatile memory 214 back to volatile memory 212 via a restore operation. The combined actions of data save and then data restore, allows the data to remain persistent through a power disruption. Accordingly, although not explicitly shown in FIG. 2, write-back cache 210 may also include hardware, firmware, and/or software for carrying out save operations. In addition, upon such subsequent power-on, software RAID 206 may cause write-back cache 210 to issue a cache flush in order to flush all data backed up via the save operation to be flushed to virtual storage resource 222.

In addition to data portion 218, non-volatile memory 214 may also include parity journal portion 220. As described in more detail below, parity journal portion 220 may be configured to store a parity journal which, during cache flush operations from backed-up cache data stored in data portion 218 of non-volatile memory 214, may store for each portion of parity data to be written to virtual storage resource 222 for which the write operation thereof has not been acknowledged by its target physical storage resource 226, a target address and value of such parity data. Although FIG. 2 depicts parity journal portion 220 as being integral to non-volatile memory 214, in some embodiments parity journal portion 220 may be stored in a persistent memory external to non-volatile memory 214.

Although the storage system of FIG. 2 depicts only a write-back cache 210, it is noted that a cache for implementing write-back caching may also be used for read caching.

Energy storage device 216 may comprise any system, device, or apparatus configured to store energy which may be used by write-back cache 210 to perform save operations in response to a loss of system input power source (e.g., alternating current input source) or other power fault. In some embodiments, energy storage device 216 may comprise a battery configured to convert stored chemical energy into electrical energy. In other embodiments, energy storage device 216 may comprise a capacitor or "supercap" configured to store electrical energy and deliver such electrical energy to write-back cache 210 when needed to perform save operations (e.g., by closure of a switch to electrically couple such capacitor to components of write-back cache 210). Although energy storage device 216 is shown in FIG. 2 as external to write-back cache 210, in some embodiments energy storage device 216 may be integral to write-back cache 210.

In addition to processor 203, memory 204, write-back cache 210, and energy storage device 216, information handling system 202 may include one or more other information handling resources.

Physical storage resources 226 may include hard disk drives, magnetic tape libraries, optical disk drives, magneto-optical disk drives, compact disk drives, compact disk arrays, disk array controllers, and/or any other system, apparatus or device operable to store media. In operation, one or more physical storage resources 226 may appear to an operating system or virtual machine executing on information handling system 202 as a single logical storage unit or virtual storage resource 222. For example, virtual storage resource 222 may comprise a RAID. Thus, in some embodiments, virtual storage resource 222 may comprise a redundant array of physical storage resources 226, wherein at least one of the physical storage resources 226 making up virtual storage resource 222 enables data redundancy in order to avoid loss of data in the event of failure and/or removal of one of the storage resources 226 making up virtual storage resource 222. Thus, virtual storage resource 222 may be implemented using a RAID standard.

FIG. 3 illustrates an example parity journal 300 which may be stored in parity journal portion 120 or parity journal portion 220, in accordance with embodiments of the present disclosure. As shown in FIG. 3, parity journal 300 may comprise any list, map, table, database, or other suitable data structure comprising one or more entries 302 and 304. Each entry 302 may set forth, during cache flush operations from backed-up cache data stored in data portion 118 of non-volatile memory 114, for each portion of parity data to be written to virtual storage resource 122 for which the write operation thereof has not been acknowledged by its target physical storage resource 126, a target address (e.g., $A_0$, $A_1$, ..., $A_n$) and value (e.g., $P_0$, $P_1$, ..., $P_n$) of such parity data to be written. Each entry 304 may set forth, during cache flush operations from backed-up cache data stored in data portion 118 of non-volatile memory 114, for each portion of write data to be written to virtual storage resource 122 for which the write operation thereof has not been acknowledged by its target physical storage resource 126, a target address (e.g., $B_0$, $B_1$, ..., $B_n$) and value (e.g., $D_0$, $D_1$, ..., $D_n$) of such data to be written.

Figure 4:
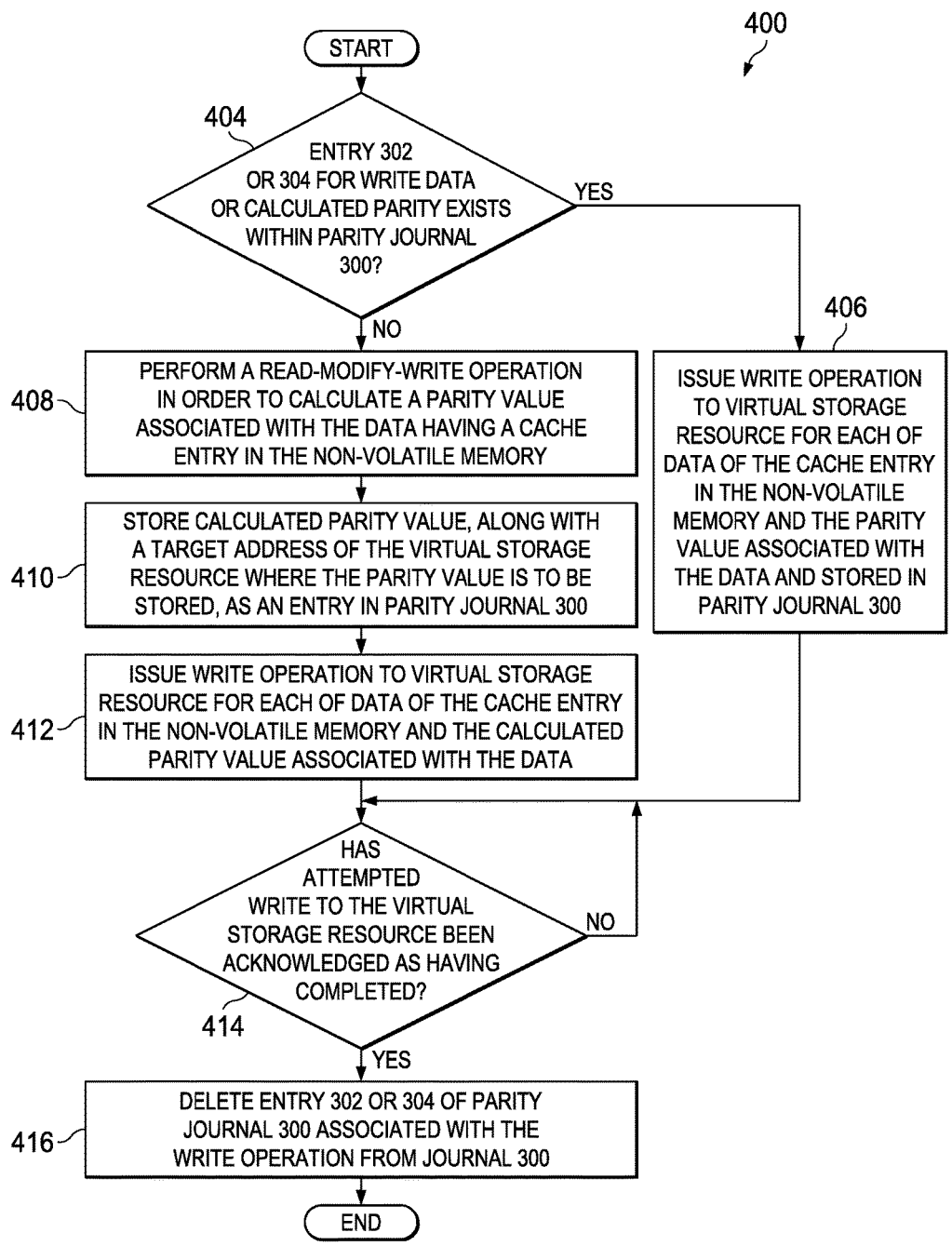
FIG. 4 illustrates a flow chart of an example method for eliminating write-hole problems on parity-based storage resources, in accordance with embodiments of the present disclosure.

FIG. 4 illustrates a flow chart of an example method 400 for eliminating write-hole problems on parity-based storage resources, in accordance with embodiments of the present disclosure. According to some embodiments, method 400 may begin at step 404. As noted above, teachings of the present disclosure may be implemented in a variety of configurations of system 100 and system 200. As such, the preferred initialization point for method 400 and the order of the steps comprising method 400 may depend on the implementation chosen. In some embodiments, method 400 may execute in response to a cache flush operation following a power event, such that data to be flushed to storage resources is data backed up in a non-volatile memory (e.g., non-volatile memory 114 or 214) of a write-back cache. The steps of method 400 listed below may be applied for each entry of data backed up to such non-volatile memory, whether such entry of data appears in a data portion 118 or 218 of a non-volatile memory (corresponding to write-back cache data) or whether the entry of data appears in a parity journal portion 120 or 220 of a non-volatile memory (corresponding to parity journal entries 302/304).

At step 404, the processor may determine, for each write-back cache entry (e.g., in data portion 118 or 218) whether a corresponding entry 302 or 304 for such write-back cache entry exists within a parity journal 300 for either of the write data or the parity data. If an entry 302 or 304 exists, method 400 may proceed to step 406. Otherwise, if no entry exists, method 400 may proceed to step 408.

At step 406, in response to an entry 302 or 304 existing within parity journal 300, the processor may cause a write operation to be issued to the virtual storage resource for each of the data of the cache entry in the non-volatile memory and the parity value associated with the data and stored in parity journal 300. After completion of step 406, method 400 may proceed to step 414.

At step 408, in response to an entry 302 or 304 not existing for the write back cache entry within parity journal 300, the processor may issue a read-modify-write operation (e.g., as is known in the art) in order to calculate a parity value associated with the data having a cache entry in the non-volatile memory.

At step 410, the processor may store the calculated parity value, along with a target address of the virtual storage resource where the parity value is to be stored, as an entry in parity journal 300.

At step 412, the processor may cause a write operation to be issued to the virtual storage resource for each of the data of the cache entry in the non-volatile memory and the calculated parity value associated with the data.

At step 414, the processor may determine if the attempted write to the virtual storage resource has been acknowledged as having completed. If the attempted write is acknowledged, method 400 may proceed to step 416. Otherwise, as long as the attempted write remains unacknowledged, method 400 may remain at step 414.

At step 416, the processor may cause the entry 302 or 304 of parity journal 300 associated with the write operation to be deleted from parity journal 300. After completion of step 416, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using processor 108, processors 203, and/or any other device operable to implement method 400. In certain embodiments, method 400 may be implemented partially or fully in software and/or firmware embodied in computer-readable media.

It is noted that while FIG. 4 depicts method 400 applied to a single entry in a write-back cache, it is understood that method 400 may be applied to each entry present in a write-back cache following a power event. Thus, once data and parity corresponding to all of the entries 302 and 304 in parity journal 300, method 400 may also apply to all entries in the write-back cache (e.g., from step 408 and after for all entries in the write-back cache without a corresponding entry in parity journal 300).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising, during a cache flush of data of a cache entry from a non-volatile memory to a storage resource, wherein the non-volatile memory is integral to a persistent write-back cache and is configured to store the data in response to a power event associated with the write-back cache:

determining whether a parity journal embodied in persistent memory includes an entry having a calculated parity for data existing in the persistent write-back cache generated during a previous boot session of an information handling system comprising the write-back cache;

determining whether the parity journal includes an entry indicating a write operation uncompleted during the previous boot session;

in response to the parity journal including the entry having the calculated parity, issuing write requests to the storage resource for the data existing in the persistent write-back cache and the calculated parity; and in response to the parity journal indicating a write operation uncompleted during the previous boot session, issuing a write request to the storage resource for data existing in the persistent write-back cache associated with the write operation.

2. The method of claim 1, further comprising, in response to a cache entry existing in the persistent write-back cache for which the parity journal includes no corresponding entry having a calculated parity:

calculating the calculated parity by undertaking a read-modify-write operation with respect to one or more storage resources comprising the storage resource for the data existing in the persistent write-back cache; and issuing write requests to the storage resource for the data of the cache entry and for the calculated parity associated with the data.

3. The method of claim 1, further comprising, in response to an acknowledgement of completion of the write request for data the calculated parity, deleting the entry of the parity journal associated with the calculated parity.

4. The method of claim 1, further comprising, in response to an acknowledgement of completion of the write request for data of the write operation uncompleted during the previous boot session, deleting the entry of the write operation uncompleted during the previous boot session.

5. The method of claim 1, wherein the parity journal is embodied in non-volatile memory.

6. A system comprising:

a persistent write-back cache comprising:
  a volatile memory;
  a non-volatile memory for backing up data stored within the volatile memory; and a processor configured to, during a cache flush of data of a cache entry from the non-volatile memory to a storage resource in response to a power event associated with the write-back cache:

determine whether a parity journal embodied in persistent memory includes an entry having a calculated parity for data existing in the persistent write-back cache during a previous boot session of the system;

determine whether the parity journal includes an entry indicating a write operation uncompleted during the previous boot session;

in response to the parity journal including the entry having the calculated parity, issue write requests to the storage resource for the data existing in the persistent write-back cache and the calculated parity; and in response to the parity journal indicating the write operation uncompleted during the previous boot session, issue a write request to the storage resource for data existing in the persistent write-back cache associated with the write operation.

7. The system of claim 6, the processor further configured to, in response to a cache entry existing in the persistent write-back cache for which the parity journal includes no corresponding entry having a calculated parity:
   calculate the calculated parity by undertaking a read-modify-write operation with respect to one or more storage resources comprising the storage resource for the data existing in the persistent write-back cache; and
   issue write requests to the storage resource for the data of the cache entry and for the calculated parity associated with the data.

8. The system of claim 6, the processor further configured to, in response to an acknowledgement of completion of the write request for the calculated parity, delete the entry of the parity journal associated with the calculated parity.

9. The system of claim 6, the processor further configured to, in response to an acknowledgement of completion of the write request for data of the write operation uncompleted during the previous boot session, delete the entry of the write operation.

10. The system of claim 6, wherein the processor is integral to a storage controller for executing hardware-based storage redundancy.

11. The system of claim 6, wherein the processor is configured to execute software-based storage redundancy.

12. The system of claim 6, wherein the parity journal is embodied in non-volatile memory.

13. A method comprising, during a cache flush of data of a cache entry from a non-volatile memory to a storage resource, wherein the non-volatile memory is integral to a persistent write-back cache and is configured to store the data in response to a power event associated with the write-back cache:
   calculating a calculated parity value by undertaking a read-modify-write operation with respect to the storage resource; and
   storing the calculated parity value and a target address of the storage resource associated with the calculated parity value in a parity journal.

14. The method of claim 13, further comprising issuing write requests to the storage resource for the data of the cache entry and for the calculated parity value associated with the data.

15. The method of claim 14, further comprising, in response to an acknowledgement of completion of the write request for the calculated parity value, deleting the entry of the parity journal associated with the calculated parity from the parity journal.

16. The method of claim 13, further comprising storing a second target address of the storage resource, the second target address associated with the write data.

17. The method of claim 16, further comprising, in response to an acknowledgement of completion of the write request for the write data, deleting the entry of the parity journal associated with the second target address from the parity journal.

18. The method of claim 13, wherein the parity journal is embodied in non-volatile memory.

19. A system comprising:
   a persistent write-back cache comprising:
      a volatile memory;
      a non-volatile memory for backing up data stored within the volatile memory; and
   a processor configured to, during a cache flush of data of a cache entry from the non-volatile memory to a storage resource in response to a power event associated with the write-back cache:
      calculate a calculated parity value by undertaking a read-modify-write operation with respect to the storage resource; and
      store the calculated parity value and a target address of the storage resource associated with the calculated parity value in a parity journal.

20. The system of claim 19, the processor further configured to issue write requests to the storage resource for the data of the cache entry and for the calculated parity value associated with the data.

21. The system of claim 20, the processor further configured to, in response to an acknowledgement of completion of the write request for the calculated parity value, delete the entry of the parity journal associated with the calculated parity value from the parity journal.

22. The system of claim 19, the processor further configured to store a second target address of the storage resource, the second target address associated with the write data.

23. The system of claim 22, the processor further configured to, in response to an acknowledgement of completion of the write request for the write data, delete the entry of the parity journal associated with the second target address from the parity journal.

24. The system of claim 19, wherein the parity journal is embodied in non-volatile memory.

* * * * *

UNITED STATES PATENT AND TRADEMARK OFFICE
CERTIFICATE OF CORRECTION

PATENT NO. : 10,303,560 B2
APPLICATION NO. : 15/431932
DATED : May 28, 2019
INVENTOR(S) : Nelogal et al.

It is certified that error appears in the above-identified patent and that said Letters Patent is hereby corrected as shown below:

In the Claims

Please amend Claim 15 as follows:
15. The method of Claim 14, further comprising, in response to an acknowledgement of completion of the write request for the calculated parity value, deleting the entry of the parity journal associated with the calculated parity value from the parity journal.

Signed and Sealed this
Ninth Day of July, 2019

Andrei Iancu
*Director of the United States Patent and Trademark Office*